US012707460B2

(12) United States Patent
Fu et al.

(10) Patent No.: US 12,707,460 B2
(45) Date of Patent: Aug. 11, 2026

(54) UPLINK SCHEDULING USING A TIMING PARAMETER ASSOCIATED WITH AN INTERNET-OF-THINGS (IoT) SERVICE SESSION

(71) Applicant: QUALCOMM Incorporated, San Diego, CA (US)

(72) Inventors: Miao Fu, Shanghai (CN); Yan Wang, Shanghai (CN); Aimin Shang, Shanghai (CN); Hao Zhang, Shanghai (CN); Jian Li, Shanghai (CN); Xuefeng Chen, Shanghai (CN); Wei He, Shanghai (CN); Zhongliang Fang, Shanghai (CN); Pan Jiang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 18/546,045

(22) PCT Filed: Apr. 19, 2021

(86) PCT No.: PCT/CN2021/088027
§ 371 (c)(1),
(2) Date: Aug. 10, 2023

(87) PCT Pub. No.: WO2022/221977
PCT Pub. Date: Oct. 27, 2022

(65) Prior Publication Data

US 2024/0147467 A1 May 2, 2024

(51) Int. Cl.
*H04W 72/1268* (2023.01)
*H04W 74/0833* (2024.01)

(52) U.S. Cl.
CPC ... *H04W 72/1268* (2013.01); *H04W 74/0833* (2013.01)

(58) Field of Classification Search
CPC ......... H04W 72/1268; H04W 74/0833; H04W 72/21; H04W 4/70
See application file for complete search history.

(56) References Cited

U.S. PATENT DOCUMENTS

2012/0057476 A1* 3/2012 Chan ..................... H04W 88/06 370/252
2017/0106530 A1* 4/2017 Shimokawa ......... G05B 19/042
(Continued)

FOREIGN PATENT DOCUMENTS

EP 2826165 B1 7/2017

OTHER PUBLICATIONS

International Search Report and Written Opinion—PCT/CN2021/088027—ISA/EPO—Oct. 22, 2021.

*Primary Examiner* — Shawn D Miller
(74) *Attorney, Agent, or Firm* — Norton Rose Fulbright US LLP

(57) ABSTRACT

An apparatus for wireless communication includes a receiver configured to receive a request for data associated with an Internet-of-things (IoT) service session with an IoT cloud server. The apparatus further includes a transmitter configured to transmit, based on receiving the request and prior to transmitting a response to the request, a message indicating a timing parameter associated with availability of the data. The receiver is further configured to receive an uplink grant at a time that is based on the timing parameter, and the transmitter is further configured to transmit the response to the request based on the uplink grant. The response includes at least a subset of the data.

30 Claims, 8 Drawing Sheets

(56) References Cited

U.S. PATENT DOCUMENTS

| | | | | |
|---|---|---|---|---|
| 2018/0098279 | A1* | 4/2018 | Edge | H04L 67/51 |
| 2018/0279276 | A1* | 9/2018 | Yeo | H04W 72/0446 |
| 2018/0320645 | A1* | 11/2018 | McQuillen | F02D 41/222 |
| 2019/0377695 | A1* | 12/2019 | Takano | H04W 4/50 |
| 2021/0051751 | A1 | 2/2021 | Pawar | |

* cited by examiner

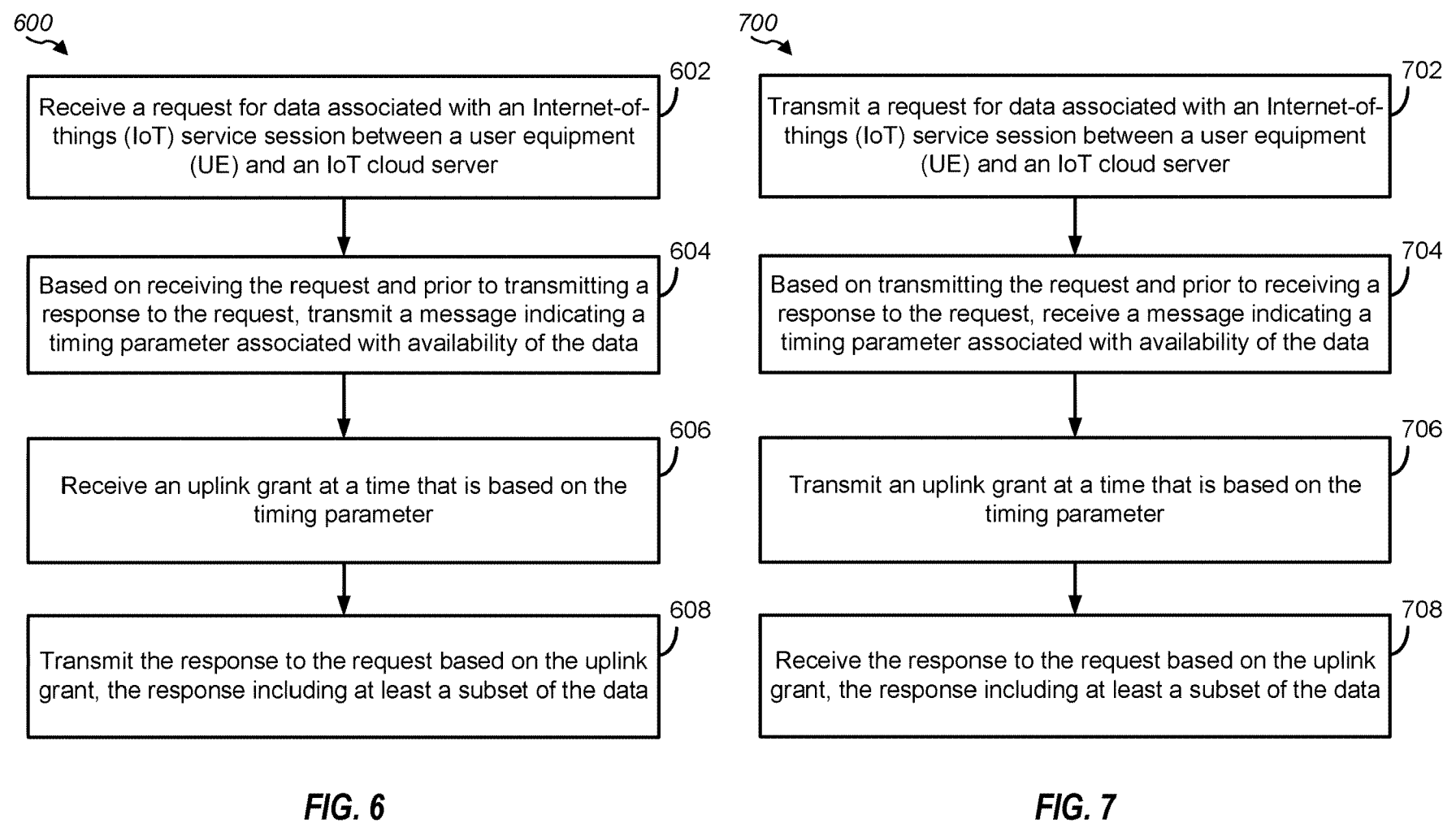

600

602 Receive a request for data associated with an Internet-of-things (IoT) service session between a user equipment (UE) and an IoT cloud server 604 Based on receiving the request and prior to transmitting a response to the request, transmit a message indicating a timing parameter associated with availability of the data 606 Receive an uplink grant at a time that is based on the timing parameter 608 Transmit the response to the request based on the uplink grant, the response including at least a subset of the data

702 Transmit a request for data associated with an Internet-of-things (IoT) service session between a user equipment (UE) and an IoT cloud server 704 Based on transmitting the request and prior to receiving a response to the request, receive a message indicating a timing parameter associated with availability of the data 706 Transmit an uplink grant at a time that is based on the timing parameter 708 Receive the response to the request based on the uplink grant, the response including at least a subset of the data

FIG. 7

UPLINK SCHEDULING USING A TIMING PARAMETER ASSOCIATED WITH AN INTERNET-OF-THINGS (IoT) SERVICE SESSION

FIELD

Aspects of the present disclosure relate generally to wireless communication systems, and more particularly, to wireless communication systems that perform uplink scheduling in connection with an Internet-of-Things (IoT) service session.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

An apparatus for wireless communication includes a receiver configured to receive a request for data associated with an Internet-of-things (IoT) service session with an IoT cloud server. The apparatus further includes a transmitter configured to transmit, based on receiving the request and prior to transmitting a response to the request, a message indicating a timing parameter associated with availability of the data. The receiver is further configured to receive an uplink grant at a time that is based on the timing parameter, and the transmitter is further configured to transmit the response to the request based on the uplink grant. The response includes at least a subset of the data.

In some other aspects of the disclosure, an apparatus for wireless communication includes a transmitter configured to transmit a request for data associated with an IoT service session between a user equipment (UE) and an IoT cloud server. The apparatus further includes a receiver configured to receive, based on transmitting the request and prior to receiving a response to the request, a message indicating a timing parameter associated with availability of the data. The transmitter is further configured to transmit an uplink grant at a time that is based on the timing parameter, and the receiver is further configured to receive the response to the request based on the uplink grant. The response includes at least a subset of the data.

In some other aspects of the disclosure, a method of wireless communication performed by a UE includes receiving a request for data associated with an IoT service session between the UE and an IoT cloud server. The method further includes, based on receiving the request and prior to transmitting a response to the request, transmitting a message indicating a timing parameter associated with availability of the data. The method further includes receiving an uplink grant at a time that is based on the timing parameter and transmitting the response to the request based on the uplink grant. The response includes at least a subset of the data.

In some other aspects of the disclosure, a method of wireless communication performed by a base station includes transmitting a request for data associated with an IoT service session between a UE and an IoT cloud server. The method further includes, based on transmitting the request and prior to receiving a response to the request, receiving a message indicating a timing parameter associated with availability of the data. The method further includes transmitting an uplink grant at a time that is based on the timing parameter and receiving the response to the request based on the uplink grant. The response includes at least a subset of the data.

BRIEF DESCRIPTION OF THE DRAWINGS

FIG. 6 is a flow chart illustrating an example of a method of wireless communication performed by a UE according to some aspects of the disclosure.

FIG. 7 is a flow chart illustrating another example of a method of wireless communication performed by a base station according to some aspects of the disclosure.

DETAILED DESCRIPTION

Figure 1:
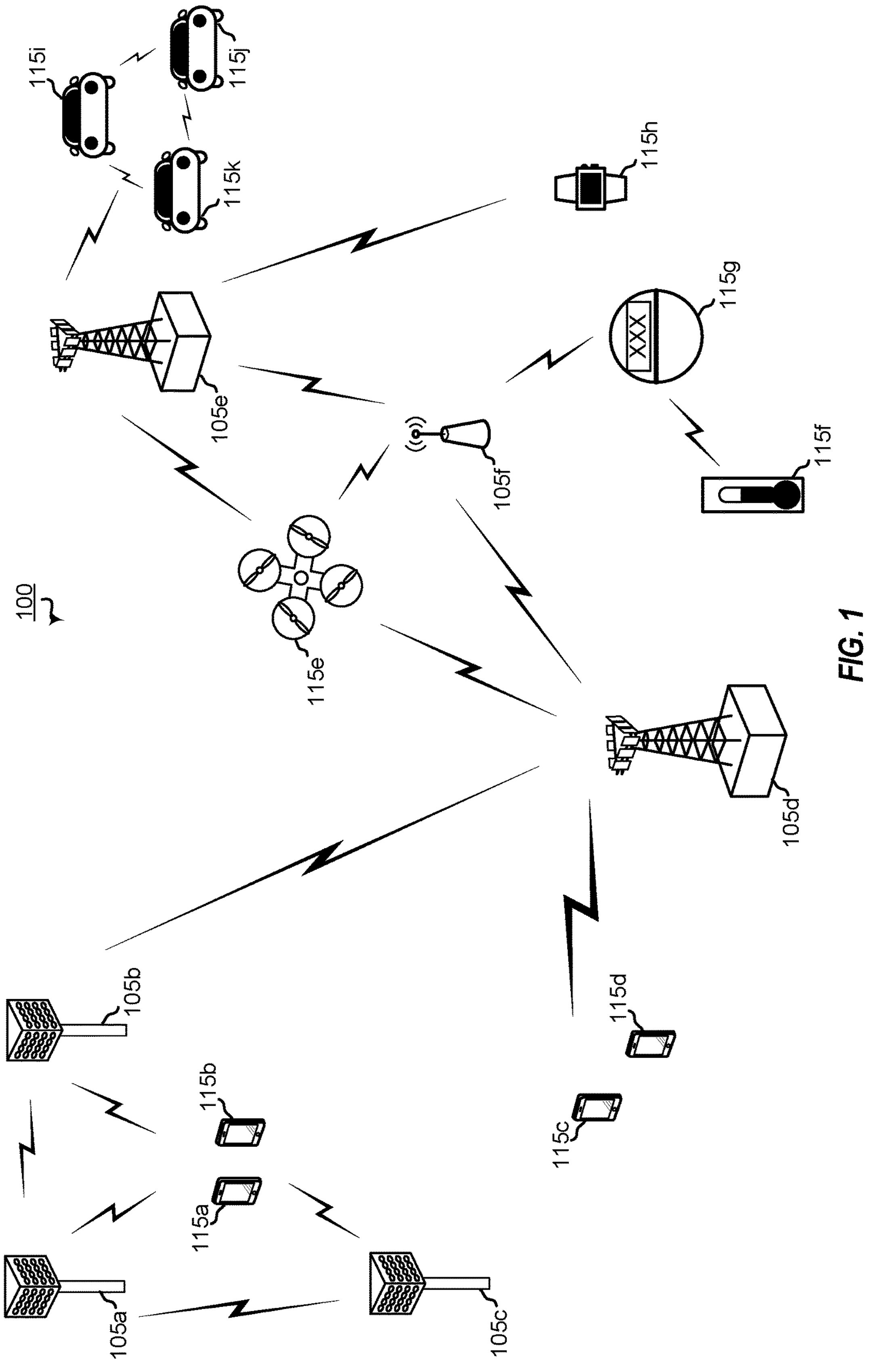
FIG. 1 is a block diagram illustrating an example of a wireless communication system according to some aspects of the disclosure.

Certain wireless communication systems use Internet-of-Things (IoT) service sessions to transfer data from one device to another. In some wireless communication systems, an IoT cloud server may request data from a device (such as a user equipment (UE) device) via a cellular network. For example, the IoT cloud server may provide a command for data to the base station, and the base station may forward the command to the UE device with an uplink grant specifying wireless resources. In response to receiving the command, the UE device may retrieve the data and may transmit the data to the IoT cloud server via the base station using the wireless resources.

In some cases, retrieving the data may be subject to a latency, such as a time interval to retrieve and process the data (e.g., transcode the data from one format to another format). If the base station continues to perform uplink scheduling associated with the UE device during the latency time interval, then uplink resources may be unused prior to availability of the data, reducing efficiency of resource allocation. Alternatively, if the base station terminates uplink scheduling if the UE device, the UE device may use a random access channel (RACH) procedure to transmit the data. In some wireless communication protocols, a RACH procedure is subject to a relatively large additional latency, such as a latency of up to approximately twenty seconds.

In some aspects of the disclosure, in response to receiving a request for data from an IoT cloud server in connection with an IoT service session, a UE device transmits to a base station a message indicating a timing parameter associated with the request. In some examples, the timing parameter corresponds to an estimated time of availability of the data (such as after a latency associated with retrieving and processing the data), such as in connection with an aperiodic data reporting mode. In some other examples, the timing parameter corresponds to a time interval between periodic reports transmitted in connection with a periodic data reporting mode.

In some implementations, the UE device may estimate (or "forecast") the timing parameter with a relatively high degree of accuracy. For example, in some implementations, a latency associated with a request may be based on a hardware configuration (such as a number or configuration of sensors generating the data) and may be associated with a margin of error that is less than a threshold margin of error. As a result, the base station may temporarily interrupt (or suspend) uplink scheduling associated with the UE device based on the timing parameter (such as by temporarily ceasing to issue uplink grants to the UE device). At a time that is based on the timing parameter, the base station may resume uplink scheduling, such as by transmitting an uplink grant to the UE device.

By temporarily interrupting uplink scheduling with the UE device based on the timing parameter, efficiency of wireless resource allocation in a wireless communication system may be increased, such as by avoiding scheduling of uplink transmissions prior to availability of the data. As a result, in some cases, wireless resources may be allocated to one or more other UEs or other devices, which may increase efficiency of wireless resource allocation as compared to certain other systems that may continue uplink scheduling associated with a UE device during processing of data prior to availability of the data (which may result in unused wireless resources).

Further, one or more aspects described herein may reduce communication latency in a wireless communication system. For example, in some wireless communication protocols, data transmission using a RACH procedure (instead of using an uplink grant) takes several seconds (such as up to approximately twenty seconds in some wireless communication protocols). Accordingly, data transmission based on an uplink grant instead of based on a RACH procedure may reduce communication latency as compared to transmitting the data based on the RACH procedure.

To further illustrate, aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunication system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km^2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~0.99.9999% reliability), ultra-low latency (such as ~1 millisecond (ms)), and users with wide ranges of mobility or lack thereof; and (3) with enhanced mobile broadband including extreme high capacity (such as ~10 Tbps per km^2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communication systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115*a*-115*d* of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115*e*-115*k* illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105*a*-105*c* serve the UEs 115*a* and 115*b* using 3D beamforming and coordinated spatial techniques, such as coordinated multipoint (CoMP) or multi-connectivity. Macro base station 105*d* performs backhaul communications with the base stations 105*a*-105*c*, as well as small cell, the base station 105*f*. Macro base station 105*d* also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115*e*, which is a drone. Redundant communication links with the UE 115*e* include from the macro base stations 105*d* and 105*e*, as well as small cell base station 105*f*. Other machine type devices, such as UE 115*f* (thermometer), the UE 115*g* (smart meter), and the UE 115*h* (wearable device) may communicate through the wireless network 100 either directly with base stations, such as the small cell base station 105*f*, and the macro base station 105*e*, or in multi-hop configurations by communicating with another user device which relays its information to the network, such as the UE 115*f* communicating temperature measurement information to the smart meter, the UE 115g, which is then reported to the network through the small cell base station 105*f*. The 5G network 100 may provide additional network efficiency through dynamic, low-latency TDD or FDD communications, such as in a vehicle-to-vehicle (V2V) mesh network between the UEs 115*i*-115*k* communicating with the macro base station 105*e*.

Figure 2:
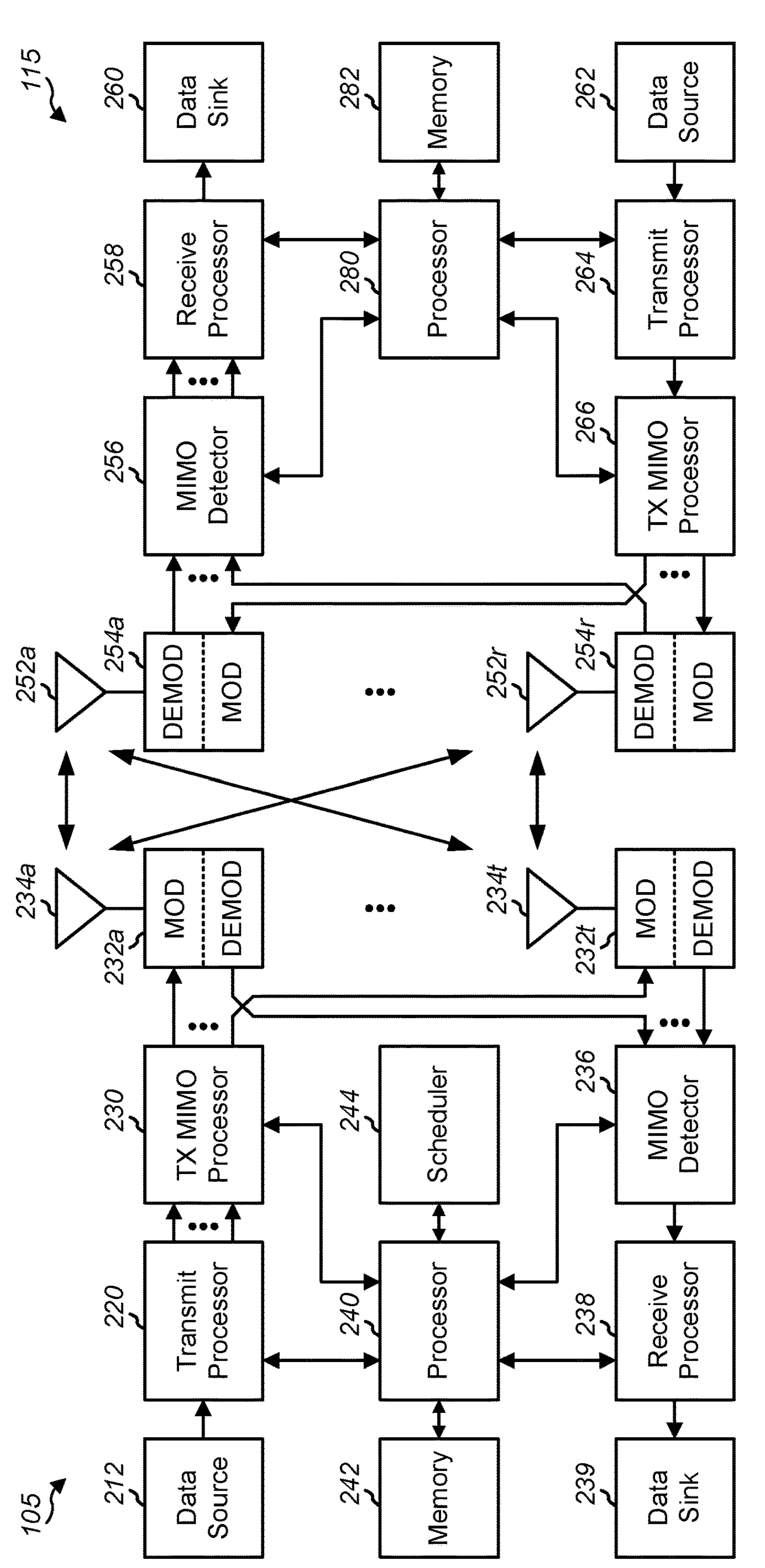
FIG. 2 is a block diagram illustrating examples of a base station and a UE according to some aspects of the disclosure.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105*f* in FIG. 1, and the UE 115 may be the UE 115*c* or 115*d* operating in a service area of the base station 105*f*, which in order to access the small cell base station 105*f*, would be included in a list of accessible UEs for the small cell base station 105*f*. Additionally, the base station 105 may be a base station of some other type. As shown in FIG. 2, the base station 105 may be equipped with antennas 234*a* through 234*t*, and the UE 115 may be equipped with antennas 252*a* through 252*r* for facilitating wireless communications.

At the base station 105, a transmit processor 220 may receive data from a data source 212 and control information from a processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254*a* through 254*r*, perform MIMO detection on the received symbols if applicable, and provide detected symbols. Receive processor 258 may process the detected symbols, provide decoded data for the UE 115 to a data sink 260, and provide decoded control information to a processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the processor 280. Additionally, the transmit processor 264 may generate reference symbols for a reference signal. The symbols from the transmit processor 264 may be precoded by TX MIMO processor 266 if applicable, further processed by the modulators 254*a* through 254*r* (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the processor 240.

The processors 240 and 280 may direct the operation at the base station 105 and the UE 115, respectively. The processor 240 or other processors and modules at the base station 105 or the processor 280 or other processors and modules at the UE 115 may perform or direct the execution of various processes for the techniques described herein, such as to perform or direct the execution illustrated in FIG. 6 or 7, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
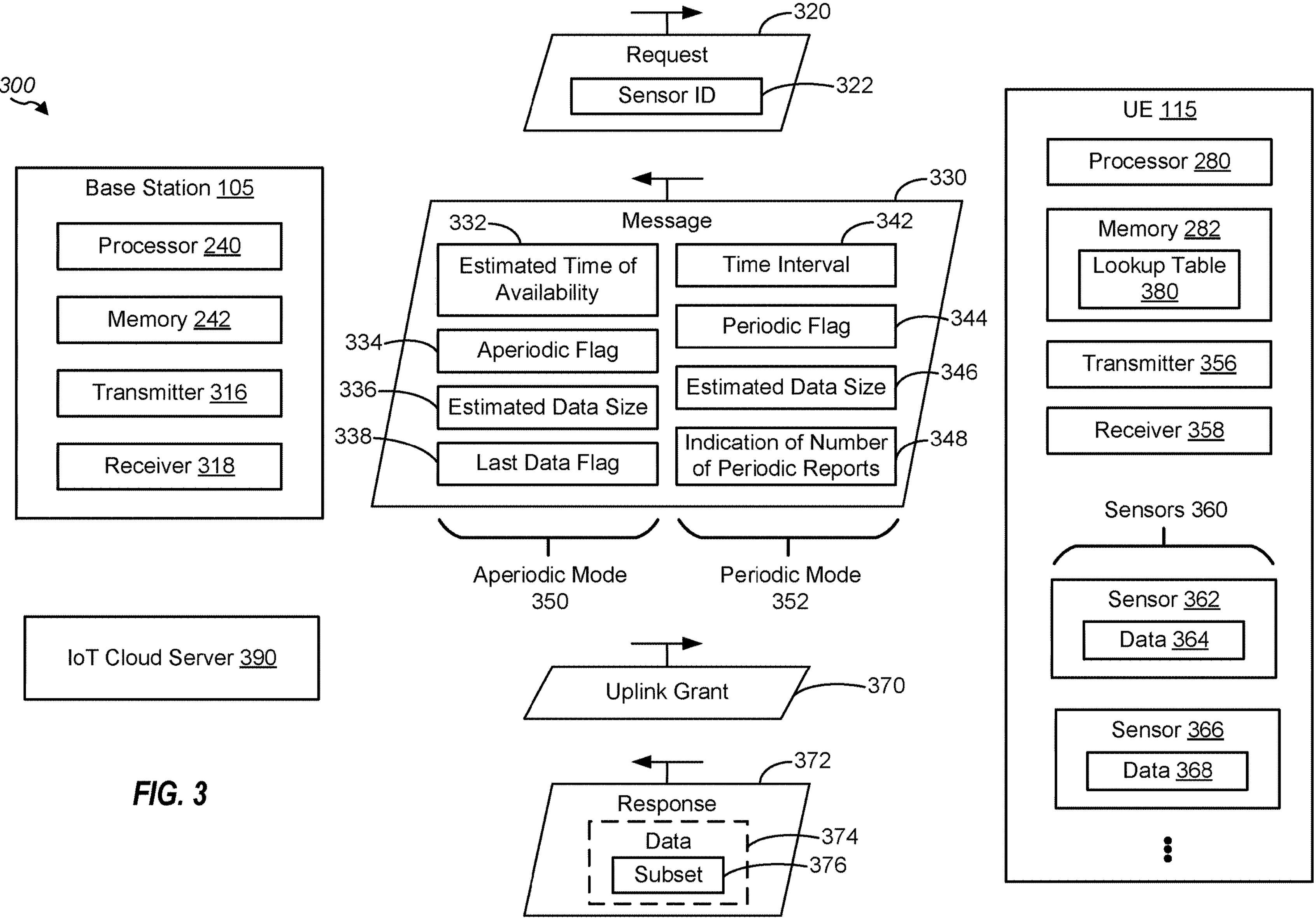
FIG. 3 is a block diagram illustrating an example of a communication system according to some aspects of the disclosure.

FIG. 3 is a block diagram illustrating an example of a communication system 300 according to some aspects of the disclosure. The communication system 300 may include one or more base stations, such as the base station 105, and may further include one or more UEs, such as the UE 115. In some implementations, the communication system 300 may further include one or more servers, such as an Internet-of-things (IoT) cloud server 390.

The example of FIG. 3 illustrates that the base station 105 may include one or more processors (e.g., the processor 240) and the memory 242. The base station 105 may further include a transmitter 316 and a receiver 318. The processor 240 may be coupled to the memory 242, to the transmitter 316, and to the receiver 318. In some examples, the transmitter 316 and the receiver 318 include one or more components described with reference to FIG. 2, such as one or more of the modulator/demodulators 232*a-t*, the MIMO detector 236, the receive processor 238, the transmit processor 220, or the TX MIMO processor 230.

FIG. 3 also illustrates that the UE 115 may include one or more processors (e.g., the processor 280) and the memory 282. The UE 115 may further include a transmitter 356 and a receiver 358. The processor 280 may be coupled to the memory 282, to the transmitter 356, and to the receiver 358. In some examples, the transmitter 356 and the receiver 358 include one or more components described with reference to FIG. 2, such as one or more of the modulator/demodulators 254*a-r*, the MIMO detector 256, the receive processor 258, the transmit processor 264, or the TX MIMO processor 266.

In some examples, the UE 115 includes or is in communication with sensors 360. For example, the sensors 360 may be integrated within the UE 115 or coupled to the UE 115. In some examples, the sensors 360 may be in wireless communication with the UE 115, such as via a wireless local area network (WLAN). The sensors 360 may include a sensor 362 and a sensor 366.

During operation, the UE 115 may receive a request 320 for data 374 associated with an IoT service session (such as a narrow-band IoT (NB-IoT) or cellular IoT (CIoT) service session) between the UE 115 and the IoT cloud server 390. To illustrate, the IoT cloud server 390 may send the request 320 to the base station 105 via a wired communication network, and the base station 105 may forward the request 320 to the UE 115 via a wireless communication network. The request 320 may specify one or more parameters associated with the data 374. To illustrate, the request 320 may include a sensor identifier (ID) that indicates one or more sensors of the sensors 360 from which the data 374 is to be generated or retrieved. Alternatively or in addition, the request 320 may indicate one or more other parameters, such as a timestamp or a time interval associated with the data 374, as an illustrative example.

Based on receiving the request 320 and prior to transmitting a response 372 to the request 320, the UE 115 may transmit a message 330 to the base station 105. The message 330 may indicate a timing parameter associated with availability of the data 374, such as a time at which the UE 115 expects to transmit the data 374. To illustrate, in some examples, the request 320 may be associated with a processing latency while the UE 115 retrieves and processes the data 374, and the timing parameter may correspond to or may be based on the processing latency. In some implementations, the processing latency may correspond to a time interval during which the processor 280 retrieves the data 374 from the sensors 360 (such as by polling or querying the sensors 360) and receives the data 374 at a memory device (such as at the memory 282 or at another memory, such as a cache that may be included in or coupled to the processor 280). Alternatively or in addition, the processing latency may correspond to a time interval during which the processor 280 performs one or more of decoding, encoding, transcoding, the data 374, such as by transcoding the data 374 from a first format associated with the sensors 360 to a second format associated with the IoT cloud server 390.

To further illustrate, in some implementations, the request 320 may specify one or more of sensors of the sensors 360 (such as via the sensor ID 322), and the timing parameter specified by the message 330 may be based on one or more of a number (or cardinality) of the one or more sensors or a type of the one or more sensors. As an example, a first sensor type (such as a video sensor type or a high resolution image sensor type) may be greater latency as compared to than a second sensor type (such as an image sensor type or a low resolution image sensor type), and the second sensor type may be associated with a greater latency as compared to a second sensor type (such as an audio sensor type). As another example, a greater number of sensors of the one or more sensors may be associated with a greater latency as compared to a lesser number of sensors of the one or more sensors.

In some implementations, the UE 115 stores a lookup table 380 of timing parameters indexed according to one or more index parameters. For example, the memory 282 may be configured to store the lookup table 380, and the processor 280 may be configured to access the lookup table 380 to determine the timing parameter indicated by the message 330. In some examples, the lookup table 380 is indexed by sensor type and by sensor number (or cardinality), and the UE 115 may determine the particular timing parameter based on the particular sensor type and sensor number specified by the request 320. In some examples, the UE 115 generates (e.g., populates) the lookup table 380 based on service history information associated with the IoT service session, such as based on historical processing latencies associated with other requests received in connection with the IoT service session.

In some implementations, the request 320 and the message 330 are associated with one or more of an aperiodic mode 350 or a periodic mode 352. In connection with the aperiodic mode 350, the UE 115 may transmit the data 374 to the base station 105 using a single response 372. In connection with the periodic mode 352, the UE 115 may transmit the data 374 to the base station 105 using multiple responses 372. To illustrate, in the periodic mode 352, the response 372 may include a subset 376 of the data 374, and after transmitting the response 372, the UE 115 may transmit another response including another subset of the data 374 that is distinct from the subset 376. As an illustrative example, the subset 376 may include data 364 from the sensor 362, and the other subset may include data 368 from the sensor 366.

To further illustrate, in the aperiodic mode 350, the timing parameter indicated by the message 330 may correspond to an estimated time of availability 332 of the data 374, and the response 372 may correspond to an aperiodic response to the request 320. The estimated time of availability 332 of the data 374 may be based on one or more previous processing times associated with responses to requests during the IoT service session between the UE 115 and the IoT cloud server 390. In some implementations, the message 330 further indicates one or more of an aperiodic flag 334 associated with the data 374, an estimated data size 336 associated with the data 374, or a last data flag 338 associated with the data 374.

In the periodic mode 352, the timing parameter may correspond to a time interval 342 between periodic reports transmitted to the base station 105 based on the request 320, and the response 372 may correspond to a particular periodic report of the periodic reports. In some implementations, the message 330 further indicates one or more of a periodic flag 344 associated with the data 374, an estimated data size 346 per periodic report transmitted to the base station 105 based on the request 320, or an indication of a number of periodic reports 348 transmitted to the base station 105 based on the request 320.

The base station 105 may receive the message 330 and may perform one or more operations based on the message 330. In some examples, based on receiving the message 330, the base station 105 temporarily interrupt uplink scheduling associated with the UE 115 based on the timing parameter indicated by the message 330. For example, in the aperiodic mode 350, the base station 105 may temporarily cease to issue uplink grants to the UE 115 until the estimated time of availability 332 (or until a time that is based on the estimated time of availability 332). As another example, in the periodic mode 352, the base station 105 may temporarily cease to issue uplink grants to the UE 115 for the duration of the time interval 342 (or until a time that is based on the time interval 342).

After temporarily interrupting uplink scheduling associated with the UE 115, the base station 105 may resume the uplink scheduling associated with the UE 115. For example, after temporarily interrupting uplink scheduling associated with the UE 115, the base station 105 may transmit an uplink grant 370 to the UE 115 at a time that is based on the timing parameter indicated by the message 330. The uplink grant 370 may schedule uplink resources for the UE 115, and the UE 115 may transmit the response 372 to the base station 105 based on the uplink grant 370, such as by transmitting the response 372 to the base station 105 using the uplink resources scheduled by the uplink grant 370. Upon receiving the response 372 from the UE 115, the base station 105 may forward the data 374 (or the subset 376 of the data 374) to the IoT cloud server 390.

In some implementations, the UE 115 may update the lookup table 380 after transmitting the response 372 to the base station 105. For example, the UE 115 may update service history information indicating processing latencies associated with requests in connection with the IoT service session. To illustrate, in some implementations, the lookup table 380 may indicate an average processing latency (or a moving average of the processing latencies) associated with data associated with the sensor ID 322, and the UE 115 may update the average processing latency (or moving average of the processing latencies) based on a time interval between receiving the request 320 and transmitting the response 372.

One or more aspects described herein may improve efficiency of allocation of wireless resources in a wireless communication system. For example, by temporarily interrupting uplink scheduling with the UE 115 based on the timing parameter indicated by the message 330, efficiency of wireless resource allocation in the communication system 300 may be increased, such as by avoiding scheduling of uplink transmissions prior to availability of the data 374. As a result, in some cases, wireless resources may be allocated to one or more other UEs or other devices, which may increase efficiency of wireless resource allocation as compared to certain other systems that may continue uplink scheduling associated with the UE 115 during processing of the data 374 prior to availability of the data 374 (which may result in unused wireless resources).

Further, one or more aspects described herein may reduce communication latency in a wireless communication system. For example, in some wireless communication protocols, transmission of the response 372 using a random access channel (RACH) procedure (instead of using the uplink grant 370) takes several seconds (such as up to approximately twenty seconds in some wireless communication protocols). Accordingly, transmitting the response 372 based on the uplink grant 370 reduces communication latency of the response 372 as compared to transmitting the response 372 based on a RACH procedure.

Figure 4:
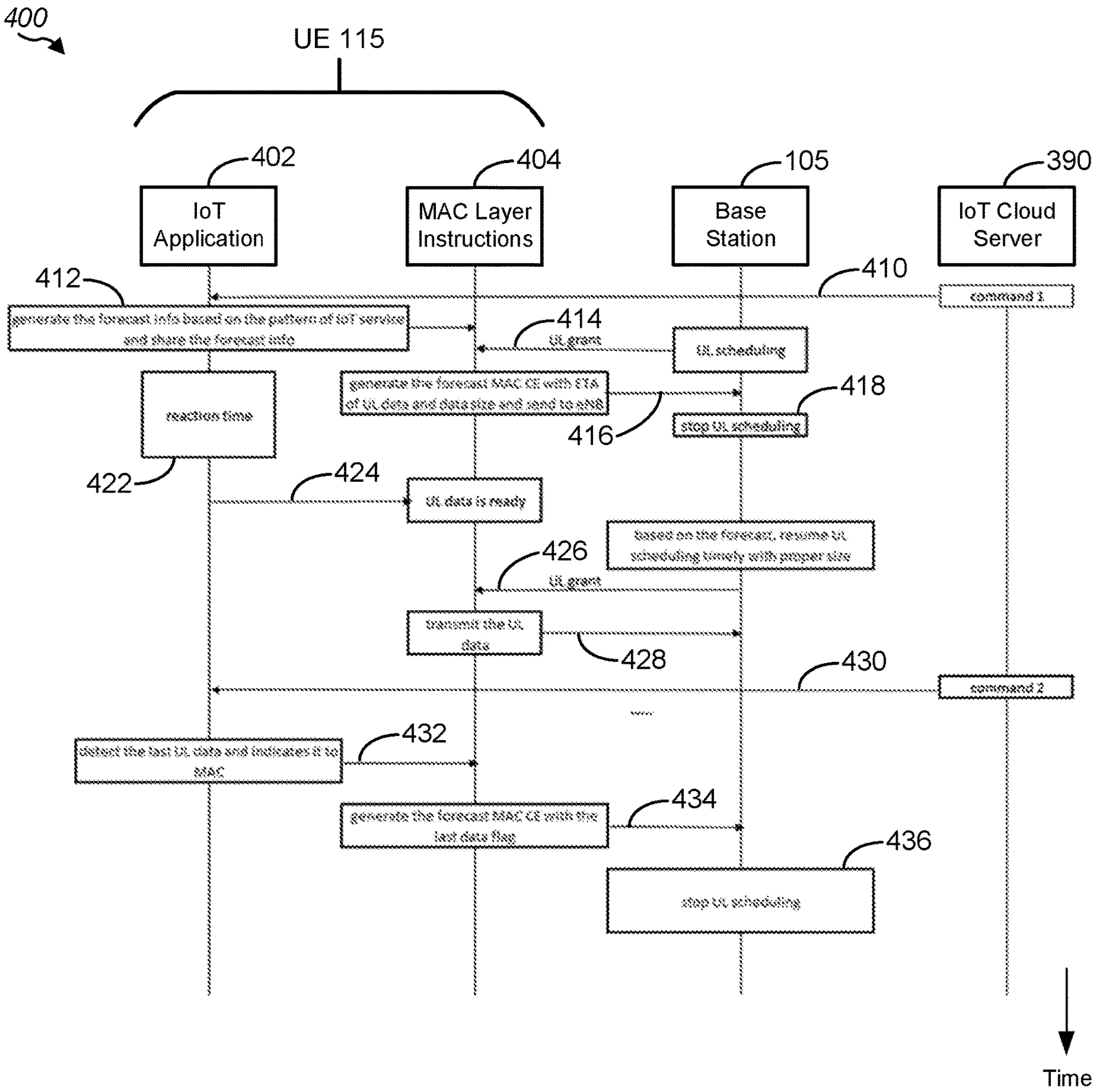
FIG. 4 is a ladder diagram illustrating examples of operations that may be performed in connection with an aperiodic mode according to some aspects of the disclosure.

FIG. 4 is a ladder diagram illustrating examples of operations 400 that may be performed in connection with the aperiodic mode 350 according to some aspects of the disclosure. The operations 400 may be performed by the UE 115, the base station 105, and the UE 115. The UE 115 may execute an IoT application 402 and medium access control (MAC) layer instructions 404.

The operations 400 may include receiving a first command from the IoT cloud server 390, at 410. The IoT application 402 may receive the first command, such as from the base station 105. In some examples, the first command corresponds to the request 320 of FIG. 3. In some examples, the first command identifies data, such as the data 374 (e.g., via the sensor ID 322).

The operations 400 may further include determining, by the IoT application 402, forecast information based on a service history of IoT service and providing the forecast information to the MAC layer instructions 404, at 412. For example, the UE 115 may determine the forecast information based on the lookup table 380, and the forecast information may include or correspond to the estimated time of availability 332.

The operations 400 may further include receiving a first uplink grant, at 414. The first uplink grant may schedule uplink resources for transmission of the data identified by the first command received from the IoT cloud server 390.

The operations 400 may further include providing the forecast information to the base station 105, at 416. For example, the UE 115 may transmit the message 330 to the base station 105, and the forecast information may include or corresponding to the estimated time of availability 332. In some examples, the message 330 has a MAC control element (MAC-CE) format.

The operations 400 may further include interrupting uplink scheduling by the base station 105, at 418. For example, the base station 105 may temporarily interrupt uplink scheduling as described with reference to FIG. 3.

The operations 400 may further include, after a reaction time 422, determining availability of the data identified by the first command, at 424. For example, the reaction time 422 may include or correspond to the processing latency described with reference to FIG. 3.

The operations 400 may further include, after resuming uplink scheduling, receiving a second uplink grant, at 426. In some examples, the second uplink grant corresponds to the uplink grant 370 of FIG. 3.

The operations 400 may further include transmitting the data based on the second uplink grant, at 428. For example, the UE 115 may transmit the response 372 including the data 374.

The operations 400 may include receiving a second command for data from the IoT cloud server 390, at 430. The IoT application 402 may receive the second command, such as from the base station 105. The operations 400 may include detecting that the data identified by the second command corresponds to last data, at 432. In response to detecting that the data identified by the second command corresponds to last data, the MAC layer instructions 404 may transmit a last data flag to the base station 105, at 434. In response to receiving the last data flag, the base station 105 may terminate uplink scheduling, at 436.

Figure 5:
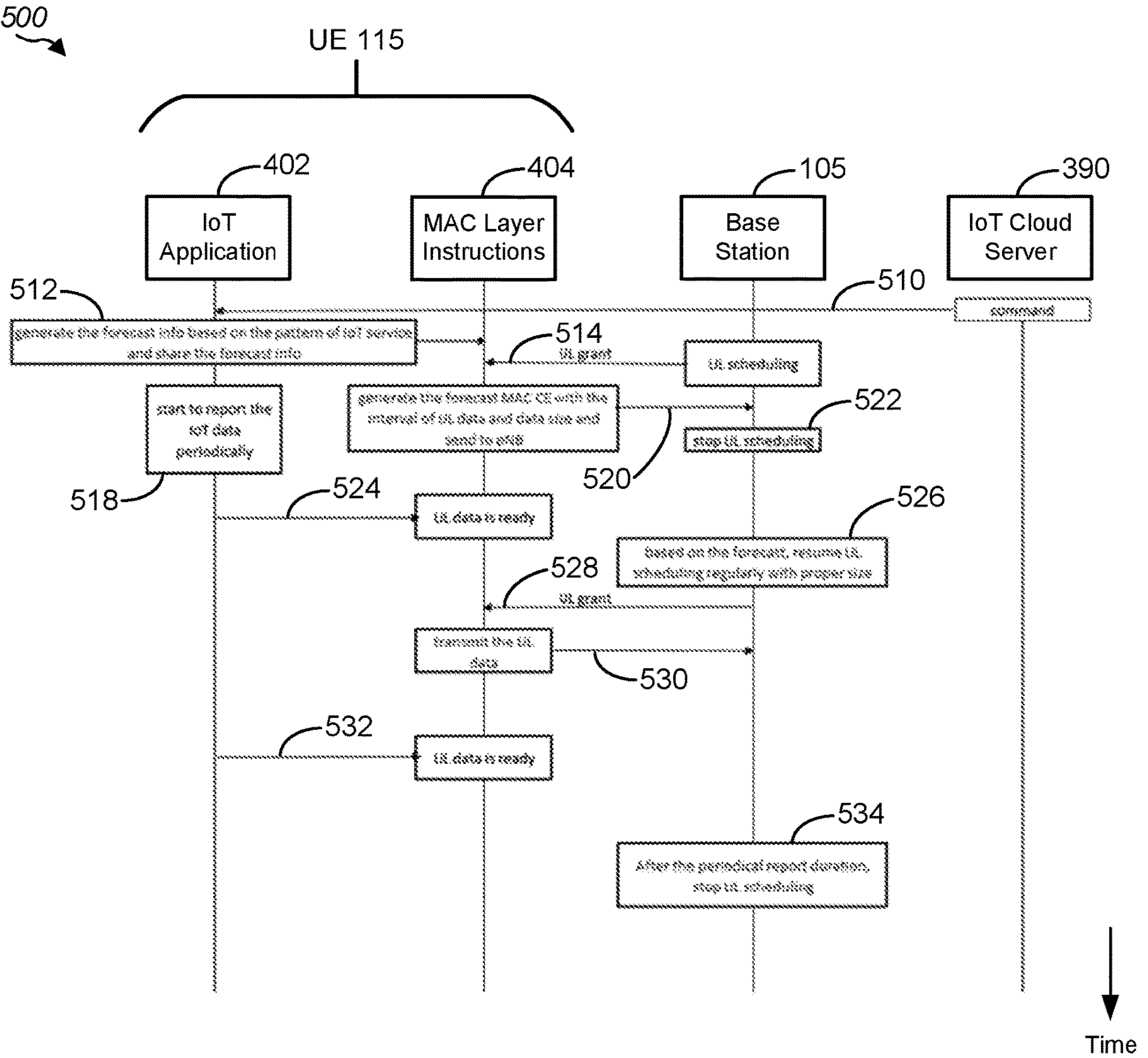
FIG. 5 is a ladder diagram illustrating examples of operations that may be performed in connection with a periodic mode according to some aspects of the disclosure.

FIG. 5 is a ladder diagram illustrating examples of operations 500 that may be performed in connection with the periodic mode 352 according to some aspects of the disclosure. The operations 500 may be performed by the UE 115, the base station 105, and the UE 115. The UE 115 may execute the IoT application 402 and the MAC layer instructions 404.

The operations 500 may include receiving a first command from the IoT cloud server 390, at 510. The IoT application 402 may receive the first command, such as from the base station 105. In some examples, the first command corresponds to the request 320 of FIG. 3. In some examples, the first command identifies data, such as the data 374 (e.g., via the sensor ID 322).

The operations 500 may further include determining, by the IoT application 402, forecast information based on a service history of IoT service and providing the forecast information to the MAC layer instructions 404, at 512. For example, the UE 115 may determine the forecast information based on the lookup table 380, and the forecast information may include or correspond to the time interval 342.

The operations 500 may further include receiving a first uplink grant, at 514. The first uplink grant may schedule uplink resources for transmission of the data identified by the first command received from the IoT cloud server 390.

The operations 500 may further include initiating periodic reporting of the data identified by the first command, at 518. For example, the UE 115 may transmit periodic reports that each include a subset of the data 374, such as the subset 376. In some examples, the response 372 corresponds to a particular periodic report of the periodic reports.

The operations 500 may further include providing the forecast information to the base station 105, at 520. For example, the UE 115 may transmit the message 330 to the base station 105, and the forecast information may include or corresponding to the time interval 342. In some examples, the message 330 has a MAC control element (MAC-CE) format.

The operations 500 may further include interrupting uplink scheduling by the base station 105, at 522. For example, the base station 105 may temporarily interrupt uplink scheduling as described with reference to FIG. 3.

The operations 500 may further include determining availability of the data identified by the second command, at 524. Based on the forecast information, the base station 105 may resume uplink scheduling, at 526, and may transmit a second uplink grant, at 528. In some examples, the second uplink grant corresponds to the uplink grant 370 of FIG. 3.

The operations 500 may further include transmitting the data based on the second uplink grant, at 530. For example, the UE 115 may transmit the response 372 including at least the subset 376 of the data 374. The operations 500 may further include transmitting one or more other periodic reports, at 532. After a duration of periodic reporting (such as a duration that is based on the indication of the number of periodic reports 348), the base station 105 may terminate uplink scheduling, at 534.

In some other aspects of the disclosure, an apparatus for wireless communication includes a transmitter configured to transmit a request for data associated with an IoT service session between a user equipment (UE) and an IoT cloud server. The apparatus further includes a receiver configured to receive, based on transmitting the request and prior to receiving a response to the request, a message indicating a timing parameter associated with availability of the data. The transmitter is further configured to transmit an uplink grant at a time that is based on the timing parameter, and the receiver is further configured to receive the response to the request based on the uplink grant. The response includes at least a subset of the data.

FIG. 6 is a flow chart illustrating an example of a method 600 of wireless communication performed by a UE according to some aspects of the disclosure. In some examples, the method 600 is performed by the UE 115.

The method 600 includes receiving a request for data associated with an IoT service session between the UE and an IoT cloud server, at 602. To illustrate, the receiver 358 is configured to receive the request 320 for the data 374 in connection with an IoT service session between the UE 115 and the IoT cloud server 390.

The method 600 further includes, based on receiving the request and prior to transmitting a response to the request, transmitting a message indicating a timing parameter associated with availability of the data, at 604. To illustrate, the transmitter 356 is configured to transmit the message 330 based on receiving the request 320 and prior to transmitting the response 372 to the request 320. The timing parameter may correspond to or include the estimated time of availability 332 (such as in connection with the aperiodic mode 350), or the time interval 342 (such as in connection with the periodic mode 352).

The method 600 further includes receiving an uplink grant at a time that is based on the timing parameter, at 606. To illustrate, the receiver 358 is configured to receive the uplink grant 370 at a time that is based on the timing parameter indicated by the message 330.

The method 600 further includes transmitting the response to the request based on the uplink grant, at 608. The response includes at least a subset of the data. To illustrate, the transmitter 356 is configured to transmit the response 372 to the request 320 based on the uplink grant 370. The response 372 includes at least the subset 376 of the data 374.

FIG. 7 is a flow chart illustrating an example of a method 700 of wireless communication performed by a base station according to some aspects of the disclosure. In some examples, the method 700 is performed by the base station 105.

The method 700 includes transmitting a request for data associated with an IoT service session between a UE and an IoT cloud server, at 702. To illustrate, the transmitter 316 is configured to transmit the request 320 for the data 374 in connection with an IoT service session between the UE 115 and the IoT cloud server 390.

The method 700 further includes, based on transmitting the request and prior to receiving a response to the request, receiving a message indicating a timing parameter associated with availability of the data, at 704. To illustrate, the receiver 318 is configured to receive the message 330 based on transmitting the request 320 and prior to receiving the response 372 to the request 320. The timing parameter may correspond to or include the estimated time of availability 332 (such as in connection with the aperiodic mode 350), or the time interval 342 (such as in connection with the periodic mode 352).

The method 700 further includes transmitting an uplink grant at a time that is based on the timing parameter, at 706. To illustrate, the transmitter 316 is configured to transmit the uplink grant 370 at a time that is based on the timing parameter indicated by the message 330.

The method 700 further includes receiving the response to the request based on the uplink grant, at 708. The response includes at least a subset of the data. To illustrate, the receiver 318 is configured to receive the response 372 to the request 320 based on the uplink grant 370. The response 372 includes at least the subset 376 of the data 374.

Figure 8:
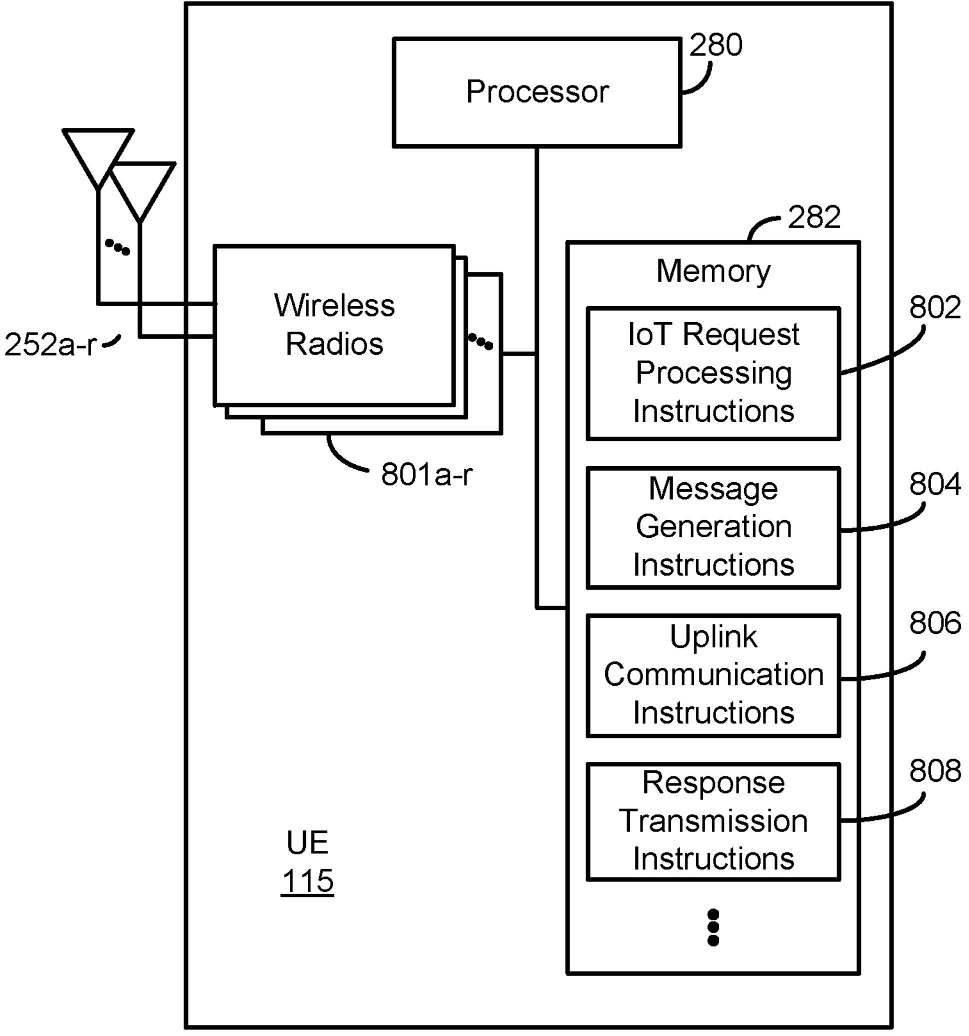
FIG. 8 is a block diagram of an example of a UE according to some aspects of the disclosure.

FIG. 8 is a block diagram illustrating an example of a UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 801*a-r* and antennas 252*a-r*. The wireless radios 801*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

In some implementations, the memory 282 stores instructions executable by the processor 280 to initiate, perform, or control one or more operations described herein. To illustrate, the memory 282 may store IoT request processing instructions 802 executable by the processor 280 to receive the request 320 and to identify one or more of the sensors 360 based on the sensor ID 322. The memory 282 may store message generation instructions 804 executable by the processor 280 to determine a timing parameter and to initiate transmission of the message 330 to indicate the timing parameter. The memory 282 may store uplink communication instructions 806 executable by the processor 280 to receive the uplink grant 370 and to identify wireless resources indicated by the uplink grant 370. The memory 282 may store response transmission instructions 808 executable by the processor 280 to initiate transmission of the response 372.

Figure 9:
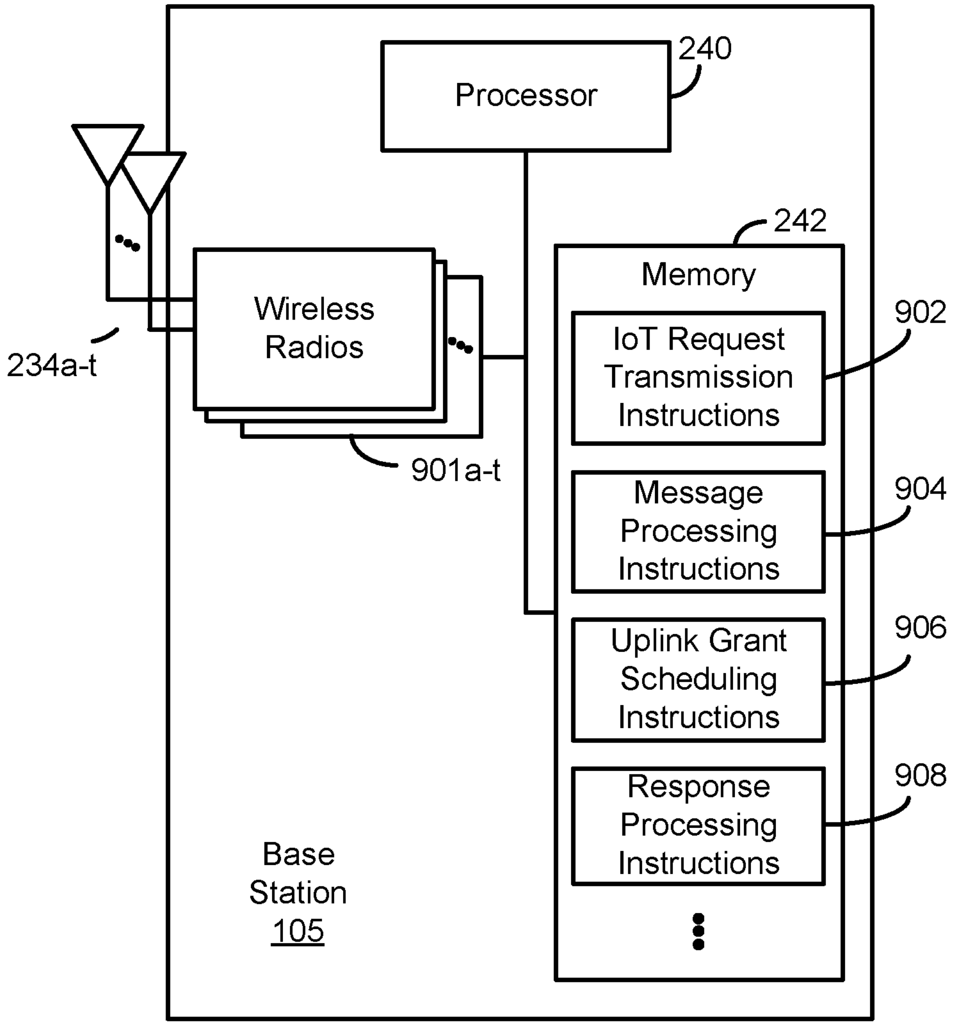
FIG. 9 is a block diagram of an example of a base station according to some aspects of the disclosure.

FIG. 9 is a block diagram illustrating an example of a base station according to some aspects of the disclosure. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 901*a-t* and antennas 234*a-t*. The wireless radios 901*a-t* may include one or more components or devices described herein, such as the modulator/demodulators 232*a-t*, the MIMO detector 236, the receive processor 238, the transmit processor 220, the TX MIMO processor 230, the transmitter 356, the receiver 358, one or more other components or devices, or a combination thereof.

In some implementations, the memory 242 stores instructions executable by the processor 240 to initiate, perform, or control one or more operations described herein. To illustrate, the memory 242 may store IoT request transmission instructions 902 executable by the processor 240 to transmit the request 320, which may indicate one or more of the sensors 360 via the sensor ID 322. The memory 242 may store message processing instructions 904 executable by the processor 240 to identify a timing parameter indicated by the message 330. The memory 242 may store uplink grant scheduling instructions 906 executable by the processor 240 to schedule wireless resources for the UE 115 and to indicate the wireless resources via transmission of the uplink grant 370. The memory 242 may store response processing instructions 908 executable by the processor 240 to receive the response 372.

According to some further aspects, in a first aspect, an apparatus for wireless communication includes a receiver configured to receive a request for data associated with an IoT service session with an IoT cloud server. The apparatus further includes a transmitter configured to transmit, based on receiving the request and prior to transmitting a response to the request, a message indicating a timing parameter associated with availability of the data. The receiver is further configured to receive an uplink grant at a time that is based on the timing parameter, and the transmitter is further configured to transmit the response to the request based on the uplink grant. The response includes at least a subset of the data.

In a second aspect alternatively or in addition to the first aspect, the apparatus includes a plurality of sensors, the request specifies one or more of the plurality of sensors, and the timing parameter is based on a number or a type of the one or more sensors.

In a third aspect alternatively or in addition to one or more of the first through second aspects, the apparatus includes a memory configured to store a lookup table indicating service history information associated with requests in connection with the IoT service session and further includes a processor coupled to the memory and configured to determine the timing parameter based on the lookup table.

In a fourth aspect alternatively or in addition to one or more of the first through third aspects, the timing parameter corresponds to an estimated time of availability of the data that is based on one or more previous processing times associated with responses to requests during the IoT service session, and the response corresponds to an aperiodic response to the request.

In a fifth aspect alternatively or in addition to one or more of the first through fourth aspects, the message indicates one or more of an aperiodic flag associated with the data, an estimated data size associated with the data, or a last data flag associated with the data.

In a sixth aspect alternatively or in addition to one or more of the first through fifth aspects, the timing parameter corresponds to a time interval between periodic reports transmitted to a base station based on the request, and the response corresponds to a particular periodic report of the periodic reports.

In a seventh aspect alternatively or in addition to one or more of the first through sixth aspects, the message indicates one or more of a periodic flag associated with the data, an estimated data size per periodic report transmitted to a base station based on the request, or an indication of a number of periodic reports transmitted to the base station based on the request.

In an eighth aspect alternatively or in addition to one or more of the first through seventh aspects, the response is transmitted based on the uplink grant instead of based on a RACH procedure.

In a ninth aspect alternatively or in addition to one or more of the first through eighth aspects, an apparatus for wireless communication includes a transmitter configured to transmit a request for data associated with an IoT service session between a UE and an IoT cloud server. The apparatus further includes a receiver configured to receive, based on transmitting the request and prior to receiving a response to the request, a message indicating a timing parameter associated with availability of the data. The transmitter is further configured to transmit an uplink grant at a time that is based on the timing parameter, and the receiver is further configured to receive the response to the request based on the uplink grant. The response includes at least a subset of the data.

In a tenth aspect alternatively or in addition to one or more of the first through ninth aspects, wherein the response is received based on the uplink grant instead of based on a RACH procedure.

In an eleventh aspect alternatively or in addition to one or more of the first through tenth aspects, the timing parameter corresponds to an estimated time of availability of the data that is based on one or more previous processing times associated with responses to requests during the IoT service session, and the response corresponds to an aperiodic response to the request.

In a twelfth aspect alternatively or in addition to one or more of the first through eleventh aspects, the message indicates one or more of an aperiodic flag associated with the data, an estimated data size associated with the data, or a last data flag associated with the data.

In a thirteenth aspect alternatively or in addition to one or more of the first through twelfth aspects, the timing parameter corresponds to a time interval between periodic reports transmitted to a base station based on the request, and the response corresponds to a particular periodic report of the periodic reports.

In a fourteenth aspect alternatively or in addition to one or more of the first through thirteenth aspects, the message indicates one or more of a periodic flag associated with the data, an estimated data size per periodic report transmitted to the base station based on the request, or an indication of a number of periodic reports transmitted to the base station based on the request.

In a fifteenth aspect alternatively or in addition to one or more of the first through fourteenth aspects, the request specifies one or more sensors of the UE, and the timing parameter is based on a number or a type of the one or more sensors.

In a sixteenth aspect alternatively or in addition to one or more of the first through fifteenth aspects, a method of wireless communication performed by a UE includes receiving a request for data associated with an IoT service session between the UE and an IoT cloud server. The method further includes, based on receiving the request and prior to transmitting a response to the request, transmitting a message indicating a timing parameter associated with availability of the data. The method further includes receiving an uplink grant at a time that is based on the timing parameter and transmitting the response to the request based on the uplink grant. The response includes at least a subset of the data.

In a seventeenth aspect alternatively or in addition to one or more of the first through sixteenth aspects, the response is transmitted based on the uplink grant instead of based on a RACH procedure.

In an eighteenth aspect alternatively or in addition to one or more of the first through seventeenth aspects, the timing parameter corresponds to an estimated time of availability of the data that is based on one or more previous processing times associated with responses to requests during the IoT service session, and the response corresponds to an aperiodic response to the request.

In a nineteenth aspect alternatively or in addition to one or more of the first through eighteenth aspects, the message indicates one or more of an aperiodic flag associated with the data, an estimated data size associated with the data, or a last data flag associated with the data.

In a twentieth aspect alternatively or in addition to one or more of the first through nineteenth aspects, the timing parameter corresponds to a time interval between periodic reports transmitted to a base station based on the request, and the response corresponds to a particular periodic report of the periodic reports.

In a twenty-first aspect alternatively or in addition to one or more of the first through twentieth aspects, the message indicates one or more of a periodic flag associated with the data, an estimated data size per periodic report transmitted to a base station based on the request, or an indication of a number of periodic reports transmitted to the base station based on the request.

In a twenty-second aspect alternatively or in addition to one or more of the first through twenty-first aspects, the request specifies one or more of sensors of the UE, and the timing parameter is based on one or more of a number of the one or more sensors or a type of the one or more sensors.

In a twenty-third aspect alternatively or in addition to one or more of the first through twenty-second aspects, the method includes determining the timing parameter based on a lookup table indicating service history information associated with requests in connection with the IoT service session.

In a twenty-fourth aspect alternatively or in addition to one or more of the first through twenty-third aspects, a method of wireless communication performed by a base station includes transmitting a request for data associated with an IoT service session between a UE and an IoT cloud server. The method further includes, based on transmitting the request and prior to receiving a response to the request, receiving a message indicating a timing parameter associated with availability of the data. The method further includes transmitting an uplink grant at a time that is based on the timing parameter and receiving the response to the request based on the uplink grant. The response includes at least a subset of the data.

In a twenty-fifth aspect alternatively or in addition to one or more of the first through twenty-fourth aspects, the response is received based on the uplink grant instead of based on a RACH procedure.

In a twenty-sixth aspect alternatively or in addition to one or more of the first through twenty-fifth aspects, the timing parameter corresponds to an estimated time of availability of the data that is based on one or more previous processing times associated with responses to requests during the IoT service session, and the response corresponds to an aperiodic response to the request.

In a twenty-seventh aspect alternatively or in addition to one or more of the first through twenty-sixth aspects, the message indicates one or more of an aperiodic flag associated with the data, an estimated data size associated with the data, or a last data flag associated with the data.

In a twenty-eighth aspect alternatively or in addition to one or more of the first through twenty-seventh aspects, the timing parameter corresponds to a time interval between periodic reports transmitted to a base station based on the request, and the response corresponds to a particular periodic report of the periodic reports.

In a twenty-ninth aspect alternatively or in addition to one or more of the first through twenty-eighth aspects, the message indicates one or more of a periodic flag associated with the data, an estimated data size per periodic report transmitted to the base station based on the request, or an indication of a number of periodic reports transmitted to the base station based on the request.

In a thirtieth aspect alternatively or in addition to one or more of the first through twenty-ninth aspects, the request specifies one or more of sensors of the UE, and the timing parameter is based on one or more of a number of the one or more sensors or a type of the one or more sensors.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more functional blocks and modules described herein may include processors, electronics devices, hardware devices, electronics components, logical circuits, memories, software codes, firmware codes, etc., or any combination thereof. Software may include instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

Those of skill would further appreciate that the various illustrative logical blocks, modules, circuits, and operations described herein may be implemented using electronic hardware, computer software, or combinations of both. To illustrate, certain blocks, modules, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a process or method described herein may be embodied in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for wireless communication, the apparatus comprising:

a receiver configured to receive a request for data associated with an Internet-of-things (IoT) service session with an IoT cloud server; and a transmitter configured to transmit, based on receiving the request and prior to transmitting a response to the request, a message indicating a timing parameter associated with availability of the data, the timing parameter based on an estimate, by the apparatus, of a time of availability of the data at the apparatus, wherein the receiver is further configured to receive an uplink grant at a time that is based on the timing parameter, and wherein the transmitter is further configured to transmit the response to the request based on the uplink grant, the response including at least a subset of the data.

2. The apparatus of claim 1, further comprising a plurality of sensors, wherein the request specifies one or more of the plurality of sensors, and wherein the timing parameter is based on a number or a type of the one or more sensors.

3. The apparatus of claim 1, further comprising:

a memory configured to store a lookup table indicating service history information associated with requests in connection with the IoT service session; and a processor coupled to the memory and configured to determine the timing parameter based on the lookup table.

4. The apparatus of claim 1, wherein the estimate of the time of availability of the data is based on one or more previous processing times associated with responses to requests during the IoT service session, and wherein the response corresponds to an aperiodic response to the request.

5. The apparatus of claim 1, wherein the message further indicates one or more of an aperiodic flag associated with the data, an estimated data size associated with the data, or a last data flag associated with the data.

6. The apparatus of claim 1, wherein the timing parameter corresponds to a time interval between periodic reports transmitted to a base station based on the request, and wherein the response corresponds to a particular periodic report of the periodic reports.

7. The apparatus of claim 1, wherein the message further indicates one or more of a periodic flag associated with the data, an estimated data size per periodic report transmitted to a base station based on the request, or an indication of a number of periodic reports transmitted to the base station based on the request.

8. The apparatus of claim 1, wherein the response is transmitted based on the uplink grant instead of based on a random access channel (RACH) procedure.

9. An apparatus for wireless communication, the apparatus comprising:

a transmitter configured to transmit a request for data associated with an Internet-of-things (IoT) service session between a user equipment (UE) and an IoT cloud server; and a receiver configured to receive, based on transmitting the request and prior to receiving a response to the request, a message indicating a timing parameter associated with availability of the data, the timing parameter based on an estimate, by the UE, of a time of availability of the data at the UE, wherein the transmitter is further configured to transmit an uplink grant at a time that is based on the timing parameter, and wherein the receiver is further configured to receive the response to the request based on the uplink grant, the response including at least a subset of the data.

10. The apparatus of claim 9, wherein the response is received based on the uplink grant instead of based on a random access channel (RACH) procedure.

11. The apparatus of claim 9, wherein the estimate of the time of availability of the data is based on one or more previous processing times associated with responses to requests during the IoT service session, and wherein the response corresponds to an aperiodic response to the request.

12. The apparatus of claim 9, wherein the message further indicates one or more of an aperiodic flag associated with the data, an estimated data size associated with the data, or a last data flag associated with the data.

13. The apparatus of claim 9, wherein the timing parameter corresponds to a time interval between periodic reports transmitted to a base station based on the request, and wherein the response corresponds to a particular periodic report of the periodic reports.

14. The apparatus of claim 9, wherein the message further indicates one or more of a periodic flag associated with the data, an estimated data size per periodic report transmitted to a base station based on the request, or an indication of a number of periodic reports transmitted to the base station based on the request.

15. The apparatus of claim 9, wherein the request specifies one or more sensors of the UE, and wherein the timing parameter is based on a number or a type of the one or more sensors.

16. A method of wireless communication performed by a user equipment (UE), the method comprising:

receiving a request for data associated with an Internet-of-things (IoT) service session between the UE and an IoT cloud server;

based on receiving the request and prior to transmitting a response to the request, transmitting a message indicating a timing parameter associated with availability of the data, the timing parameter based on an estimate, by the UE, of a time of availability of the data at the UE;

receiving an uplink grant at a time that is based on the timing parameter; and transmitting the response to the request based on the uplink grant, the response including at least a subset of the data.

17. The method of claim 16, wherein the response is transmitted based on the uplink grant instead of based on a random access channel (RACH) procedure.

18. The method of claim 16, wherein the estimate of the time of availability of the data is based on one or more previous processing times associated with responses to requests during the IoT service session, and wherein the response corresponds to an aperiodic response to the request.

19. The method of claim 16, wherein the message further indicates one or more of an aperiodic flag associated with the data, an estimated data size associated with the data, or a last data flag associated with the data.

20. The method of claim 16, wherein the timing parameter corresponds to a time interval between periodic reports transmitted to a base station based on the request, and wherein the response corresponds to a particular periodic report of the periodic reports.

21. The method of claim 16, wherein the message further indicates one or more of a periodic flag associated with the data, an estimated data size per periodic report transmitted to a base station based on the request, or an indication of a number of periodic reports transmitted to the base station based on the request.

22. The method of claim 16, wherein the request specifies one or more sensors of the UE, and wherein the timing parameter is based on one or more of a number of the one or more sensors or a type of the one or more sensors.

23. The method of claim 16, further comprising determining the timing parameter based on a lookup table indicating service history information associated with requests in connection with the IoT service session.

24. A method of wireless communication performed by a base station, the method comprising:

transmitting a request for data associated with an Internet-of-things (IoT) service session between a user equipment (UE) and an IoT cloud server;

based on transmitting the request and prior to receiving a response to the request, receiving a message indicating a timing parameter associated with availability of the data, the timing parameter based on an estimate, by the UE, of a time of availability of the data at the UE;

transmitting an uplink grant at a time that is based on the timing parameter; and receiving the response to the request based on the uplink grant, the response including at least a subset of the data.

25. The method of claim 24, wherein the response is received based on the uplink grant instead of based on a random access channel (RACH) procedure.

26. The method of claim 24, wherein the estimate of the time of availability of the data is based on one or more previous processing times associated with responses to requests during the IoT service session, and wherein the response corresponds to an aperiodic response to the request.

27. The method of claim 24, wherein the message further indicates one or more of an aperiodic flag associated with the data, an estimated data size associated with the data, or a last data flag associated with the data.

28. The method of claim 24, wherein the timing parameter corresponds to a time interval between periodic reports transmitted to the base station based on the request, and wherein the response corresponds to a particular periodic report of the periodic reports.

29. The method of claim 24, wherein the message further indicates one or more of a periodic flag associated with the data, an estimated data size per periodic report transmitted to the base station based on the request, or an indication of a number of periodic reports transmitted to the base station based on the request.

30. The method of claim 24, wherein the request specifies one or more sensors of the UE, and wherein the timing parameter is based on one or more of a number of the one or more sensors or a type of the one or more sensors.

* * * * *